(12) United States Patent
Zaloga et al.

(10) Patent No.: US 8,567,554 B2
(45) Date of Patent: Oct. 29, 2013

(54) RECIRCULATING BALL POWER STEERING SYSTEM

(75) Inventors: Miroslaw Zaloga, Shelby Township, MI (US); George E. Doerr, Clarkston, MI (US); Christopher J. Mielke, Shelby Township, MI (US); Scott R. Kloess, Rochester Hills, MI (US); Mauro Pacheco Escobedo, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 258 days.

(21) Appl. No.: 13/069,645

(22) Filed: Mar. 23, 2011

(65) Prior Publication Data

US 2012/0241243 A1    Sep. 27, 2012

(51) Int. Cl.
*B62D 5/04* (2006.01)

(52) U.S. Cl.
USPC ............................................. 180/446

(58) Field of Classification Search
USPC .................................................. 180/443, 444
See application file for complete search history.

(56) References Cited

U.S. PATENT DOCUMENTS

| | | | | |
|---|---|---|---|---|
| 5,299,649 A * | 4/1994 | Sano et al. | ..................... | 180/400 |
| 6,065,561 A * | 5/2000 | Howard | ........................ | 180/441 |
| 6,374,693 B1 * | 4/2002 | Kawabe et al. | .................. | 74/499 |
| 6,547,029 B2 * | 4/2003 | Peppler et al. | ................ | 180/402 |
| 2013/0032430 A1 * | 2/2013 | Zaloga et al. | ................. | 180/444 |

* cited by examiner

*Primary Examiner* — Kevin Hurley
(74) *Attorney, Agent, or Firm* — Quinn Law Group, PLLC

(57) ABSTRACT

A power steering system for transferring torque to a sector gear includes a first ball screw and a first ball nut circumscribing the first ball screw. The first ball nut is in torque-transfer communication with the first ball screw through a plurality of ball bearings and is meshed or engaged with the sector gear for torque transfer therewith. An electric motor is configured to selectively supply torque to the sector gear through the first ball nut.

14 Claims, 5 Drawing Sheets

US 8,567,554 B2

RECIRCULATING BALL POWER STEERING SYSTEM

TECHNICAL FIELD

This disclosure relates to recirculating ball power steering systems for vehicles.

BACKGROUND

Vehicles use steering systems to communicate commanded changes, such as through a steering wheel, in direction or course from the driver to the steerable wheels of the vehicle, often the front wheels. Power steering systems assist the driver of the vehicle in steering by adding power to that supplied by the driver and reducing the effort needed to turn the steering wheel manually.

SUMMARY

A power steering system for transferring torque to a sector gear is provided. The power steering system includes a first ball screw and a first ball nut circumscribing the first ball screw. The first ball nut is in torque-transfer communication with the first ball screw through a plurality of ball bearings. The first ball nut is also meshed with the sector gear for torque transfer therewith. An electric motor is configured to selectively supply torque to the sector gear through the first ball nut. The power steering system may include a drive unit disposed between the electric motor and the first ball nut, such that the drive unit facilitates torque transfer between the electric motor and the first ball nut.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
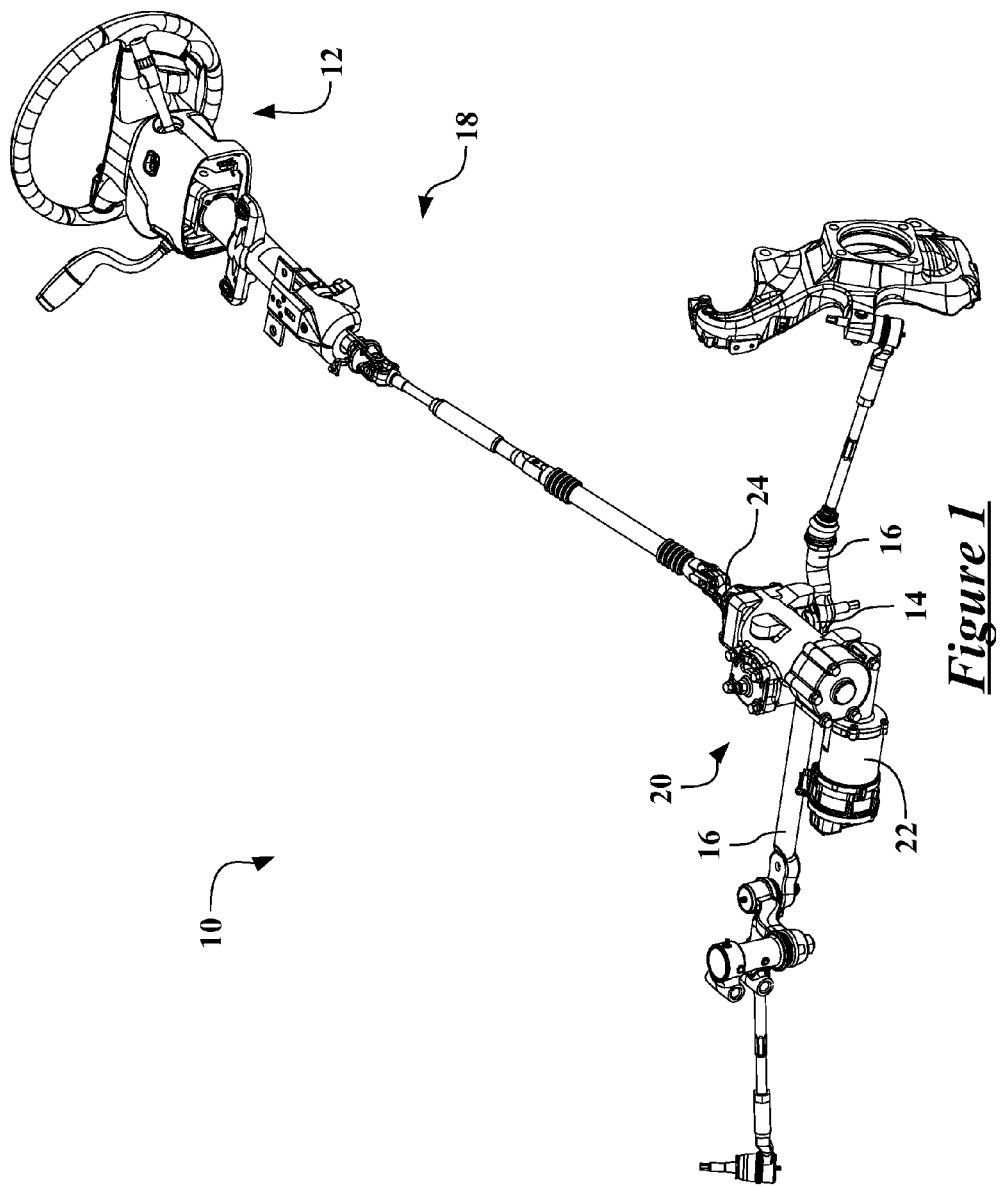
FIG. 1 is a schematic isometric view of an electric recirculating ball power steering system for a vehicle.

Referring to the drawings, wherein like reference numbers correspond to like or similar components whenever possible throughout the several figures, there is shown in FIG. 1 a schematic diagram of a recirculating ball power steering system 10 for a vehicle (the remainder of which is not shown). FIG. 1 shows some of the primary components of the steering system 10, which may be located toward the front of the vehicle. Features and components shown in other figures may be incorporated and used with those shown in FIG. 1.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The steering system 10 transfers rotation and torque from a steering wheel 12 to a pitman arm 14 (partially blocked from view), which moves a relay rod 16. The wheels (not shown) of the vehicle are turned through movement of the relay rod 16. A steering column 18 is attached to the steering wheel 12, and includes various linkages, sensor, switches, and accessories. The steering wheel 12 shown is illustrative only and other types of steering devices may be used with the steering system 10. A recirculating ball mechanism 20, examples of which will be described in more detail herein, transfers torque from the steering wheel 12 to the pitman arm 14.

In the steering system 10 shown in FIG. 1, the steering wheel 12 acts as the input member. Input signals—in the form of torque and rotational movement—are input to the steering wheel 12 by the operator or driver of the vehicle. The front wheels of the vehicle are the output members in the steering system 10 shown in FIG. 1. Therefore, the recirculating ball mechanism 20 is an intermediary between the input from the steering wheel 12 and the output to the pitman arm 14 and the wheels. Other input and output members may be used with the steering system 10 and the recirculating ball mechanism 20. For example, and without limitation, the recirculating ball mechanism 20 may receive input signals from a drive-by-wire system that is not directly linked to the steering wheel 12, in which case the input member may be a solenoid or small electric machine and the steering column may be removed or shortened. Furthermore, the pitman arm 14 and relay rods 16 may be linked to rear wheels (not shown) of the vehicle.

In order to selectively increase the torque transferred from the steering wheel 12 by the vehicle operator, the steering system 10 also includes an electric machine or electric motor 22. The recirculating ball mechanism 20 also transfers torque and power from the electric motor 22 to the pitman arm 14 and combines torque from both the steering wheel 12 and the electric motor 22 to move the pitman arm 14 and the relay rod 16. Torque and rotation of the steering wheel 12 are transferred to an input shaft 24 of the recirculating ball mechanism 20.

The steering system 10 is characterized by the lack of a boost mechanism on the steering column 18 disposed between the steering wheel 12 and the input shaft 24 (partially blocked from view), such that the steering system 10 does not include column assist. Furthermore, the recirculating ball mechanism 20 does not include a hydraulic boost or hydraulic assist. The amount of torque and power supplied by the electric machine 22 may be varied based upon driving conditions of the vehicle.

The steering system 10 may include a controller or control system (not shown). The control system may include one or more components with a storage medium and a suitable amount of programmable memory, which are capable of storing and executing one or more algorithms or methods to effect control of the steering system 10 and, possibly, other components of the vehicle. The control system is in communication with, at least, the electric motor 22 and the input shaft 24. The control system may be in communication with numerous sensors and communication systems of the vehicle. Each component of the control system may include distributed controller architecture, such as a microprocessor-based electronic control unit (ECU). Additional modules or processors may be present within the control system.

Figure 2:
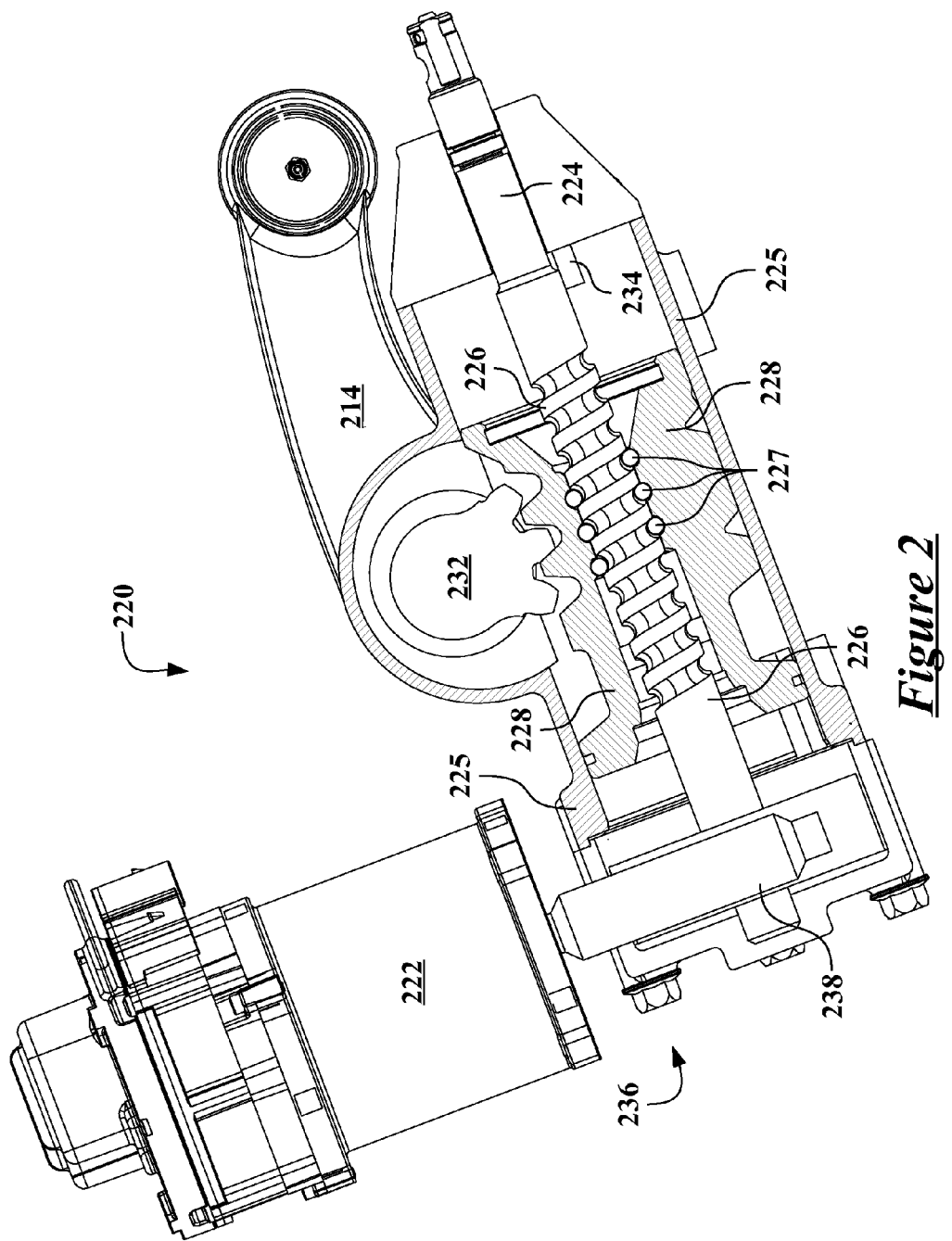
FIG. 2 is a schematic, isometric, partial cross-sectional view of an electric recirculating ball mechanism usable with power steering systems such as that shown in FIG. 1 and others, showing an electric motor mounted on the forward side of the recirculating ball mechanism.

Referring now to FIG. 2, and with continued reference to FIG. 1, there is shown a recirculating ball mechanism 220 usable with power steering systems, such as the steering system 10 shown in FIG. 1. FIG. 2 generally shows a top view of the recirculating ball mechanism 220. Features and components shown in other figures may be incorporated and used with those shown in FIG. 2.

The recirculating ball mechanism 220 combines torque from a steering wheel (not shown) or another input member and an electric motor 222 and transfers torque to and from a pitman arm 214. An input shaft 224 is operatively connected to the steering wheel, such as through a steering column and linkage (not shown) and is carried within a housing 225. The input shaft 224 may be connected to other input members. Portions of the housing 225 have either been removed or cross-sectioned to better illustrate the workings of the recirculating ball mechanism 220. The housing 225 (and the other housing configurations shown) is illustrative only and may take different forms from that shown in the figures.

The input shaft 224 has a first ball screw 226 formed on one end. The first ball screw 226 shown is formed as an integral, one-piece member with the input shaft 224. The housing 225 may be formed in more than one piece and include various seals and bearings to facilitate movement of the components of the recirculating ball mechanism 220.

A first ball nut 228 circumscribes the first ball screw 226 and is in torque-transfer communication with the first ball screw 226 through a plurality of ball bearings 227, shown schematically, which circulate between the first ball screw 226 and the first ball nut 228. The housing 225 surrounds the first ball nut 228 and guides movement thereof, such that the first ball nut 228 slides but does not rotate within the housing 225. Rotation of the steering wheel causes the input shaft 224 and the first ball screw 226 to rotate. As the first ball screw 226 rotates, the rotation is transferred to the first ball nut 228 and causes linear (left and right, as viewed in FIG. 2) movement of the first ball nut 228.

The first ball nut 228 is meshed with a sector gear 232 for torque transfer therewith. The sector gear 232 is rigidly attached, such as through a splined connection, to the pitman arm 214, and may be carried or supported by the housing 225 or other structure. Therefore, linear movement of the first ball nut 228 causes rotation of the sector gear 232, such that movement of the steering wheel results in movement of the sector gear 232 and the pitman arm 214.

The recirculating ball mechanism 220 includes one or more sensors 234 configured to determine torque at the input shaft 224. The sensors 234 monitor the torque and displacement of the input shaft 224 from the operator inputs to the steering wheel or other control device. The sensors 234 also monitor the reactive torque transferred to the input shaft 224 by the vehicle wheels. The sensors 234 are shown only schematically and may include multiple sensors of different types. Furthermore, the sensors 234 may be in communication with one or more control systems (not shown) to process signals or commands from the sensors 234.

The electric motor 222 is configured to selectively supply torque to the sector gear 232 through the recirculating ball mechanism 220. The amount of torque delivered by the electric motor 222 may be variably delivered based upon, in part, the signals from the sensors 234, the control system, or other components and sensors. Furthermore, the electric motor 222 may be controlled for use with other vehicle systems, including, but not limited to: electronic stability control, parking assist, and lane-departure. In rear-wheel steering or drive-by-wire configurations, the sensors 234 may directly monitor the steering wheel, which may not be mechanically linked to the input shaft 224.

A drive unit 236 is disposed between the electric motor 222 and the first ball nut 228, and enables torque transfer between the electric motor 222 and the sector gear 232. Portions of the drive unit 236 have been removed or cross-sectioned to better illustrate the workings of the drive unit 236. In the configuration shown in FIG. 2, the drive unit 236 is driven by a worm gear 238. The drive unit 236 is directly connected to, and acts on, the first ball screw 226 on the end of the housing 225 opposite from the input shaft 224—the forward side, relative to the forward direction of travel for the vehicle. The first ball screw 226 then transfers torque to the first ball nut 228. Therefore, the electric motor 222 boosts the torque and power delivered to the sector gear 232 and the vehicle wheels.

Other configurations of the drive unit 236, some of which are discussed herein, may be used with the recirculating ball mechanism 220. For example, and without limitation, the drive unit 236 may be driven by a chain or belt instead of the worm gear 238, or the drive unit 236 may include other gears, sprockets, et cetera. Furthermore, the location of the connection from the drive unit 236 may vary, as long as the linkage between the electric motor 222 and the sector gear 232 is maintained for sufficient torque transfer and steering assistance.

Alternatively, the recirculating ball mechanism 220 may be utilized with rear-wheel steering systems. In such a configuration, the recirculating ball mechanism 220 may not include the input shaft 224 and the input signals would come from the control system, which may be monitoring the steering wheel and converting driver commands into torque needed to turn the rear wheels (not shown). In rear-wheel applications, the recirculating ball mechanism 220 may use the electric motor 222 as the sole source of torque for turning the rear wheels.

Figure 3:
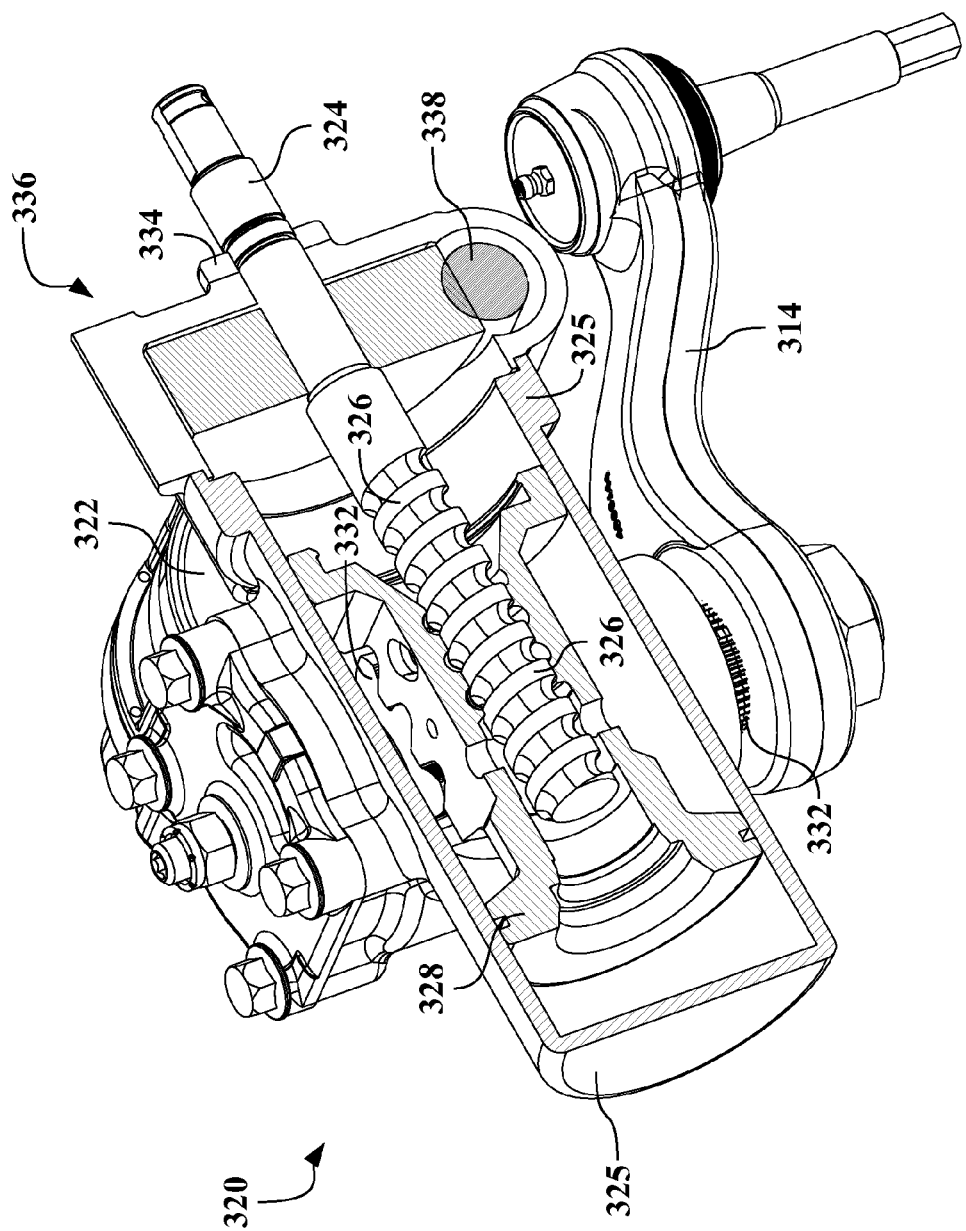
FIG. 3 is a schematic, isometric, partial cross-sectional view of an electric recirculating ball mechanism usable with power steering systems similar to that shown in FIG. 1, showing an electric motor mounted on the rearward, or input-shaft, side of the recirculating ball mechanism.

Referring now to FIG. 3, and with continued reference to FIGS. 1 and 2, there is shown a recirculating ball mechanism 320 usable with power steering systems, such as the steering system 10 shown in FIG. 1. FIG. 3 generally shows a side view of the recirculating ball mechanism 320, which is similar to the recirculating ball mechanism 220 shown in FIG. 2. Features and components shown in other figures may be incorporated and used with those shown in FIG. 3.

The recirculating ball mechanism 320 combines torque from a steering wheel (not shown) or another input member and an electric motor 322 and transfers torque to and from a pitman arm 314. An input shaft 324 is operatively connected to the steering wheel and is carried within a housing 325. Portions of the housing 325 have been removed or cross-sectioned to better illustrate the workings of the recirculating ball mechanism 320. The input shaft 324 has a first ball screw 326 formed on one end. The first ball screw 326 shown is formed as an integral, one-piece member with the input shaft 324.

A first ball nut 328 circumscribes the first ball screw 326 and is in torque-transfer communication with the first ball screw 326 through a plurality of ball bearings (not shown in FIG. 3, but illustrated schematically in FIG. 2), which circulate between the first ball screw 326 and the first ball nut 328. The housing 325 surrounds the first ball nut 328 and guides movement thereof. Rotation of the steering wheel causes the input shaft 324 and the first ball screw 326 to rotate. As the first ball screw 326 rotates, the rotation is transferred to the first ball nut 328 and causes linear movement (generally left and right, as viewed in FIG. 3) of the first ball nut 328.

The first ball nut 328 is meshed with and engages a sector gear 332 (largely hidden from view) for torque transfer therewith. The sector gear 332 is rigidly attached, such as through a splined connection, to the pitman arm 314. Therefore, linear movement of the first ball nut 328 causes rotation of the sector gear 332, such that movement of the steering wheel results in movement of the sector gear 332 and the pitman arm 314.

The recirculating ball mechanism 320 includes one or more sensors 334 configured to determine torque at the input shaft 324 or the first ball screw 326. The sensors 334 monitor the torque and displacement of the input shaft 324 communicated from the operator inputs to the steering wheel, and also monitor the reactive torque transferred back to the input shaft 324 by the vehicle wheels. The sensors 334 may include multiple sensors of different types and may be in communication with a control system (not shown) to process signals or commands from the sensors 334.

The electric motor 322 is configured to selectively supply torque to the sector gear 332 through the recirculating ball mechanism 320. The amount of torque delivered by the electric motor 322 may be based, in part, upon the signals from the sensors 334, the control system, or other components and sensors.

A drive unit 336 is disposed between the electric motor 322 and the first ball nut 328, and enables torque transfer between the electric motor 322 and the sector gear 332. Portions of the drive unit 336 have been removed or cross-sectioned to better illustrate the workings of the drive unit 336. In the configuration shown in FIG. 3, the drive unit 336 is driven by a worm gear 338, and is directly connected to, and acts on, the first ball screw 326.

The drive unit 336 of FIG. 3 acts on the end of the housing 325 adjacent to the input shaft 324, allowing the electric motor 322 and the drive unit 336 to be placed on the steering wheel side of the recirculating ball mechanism 320. The connections between the drive unit 336 and the first ball screw 326 are shown schematically, and individual gear teeth are not illustrated. The first ball screw 326 then transfers torque to the first ball nut 328. Therefore, the electric motor 322 boosts the torque and power delivered to the sector gear 332 and the vehicle wheels.

Figure 4:
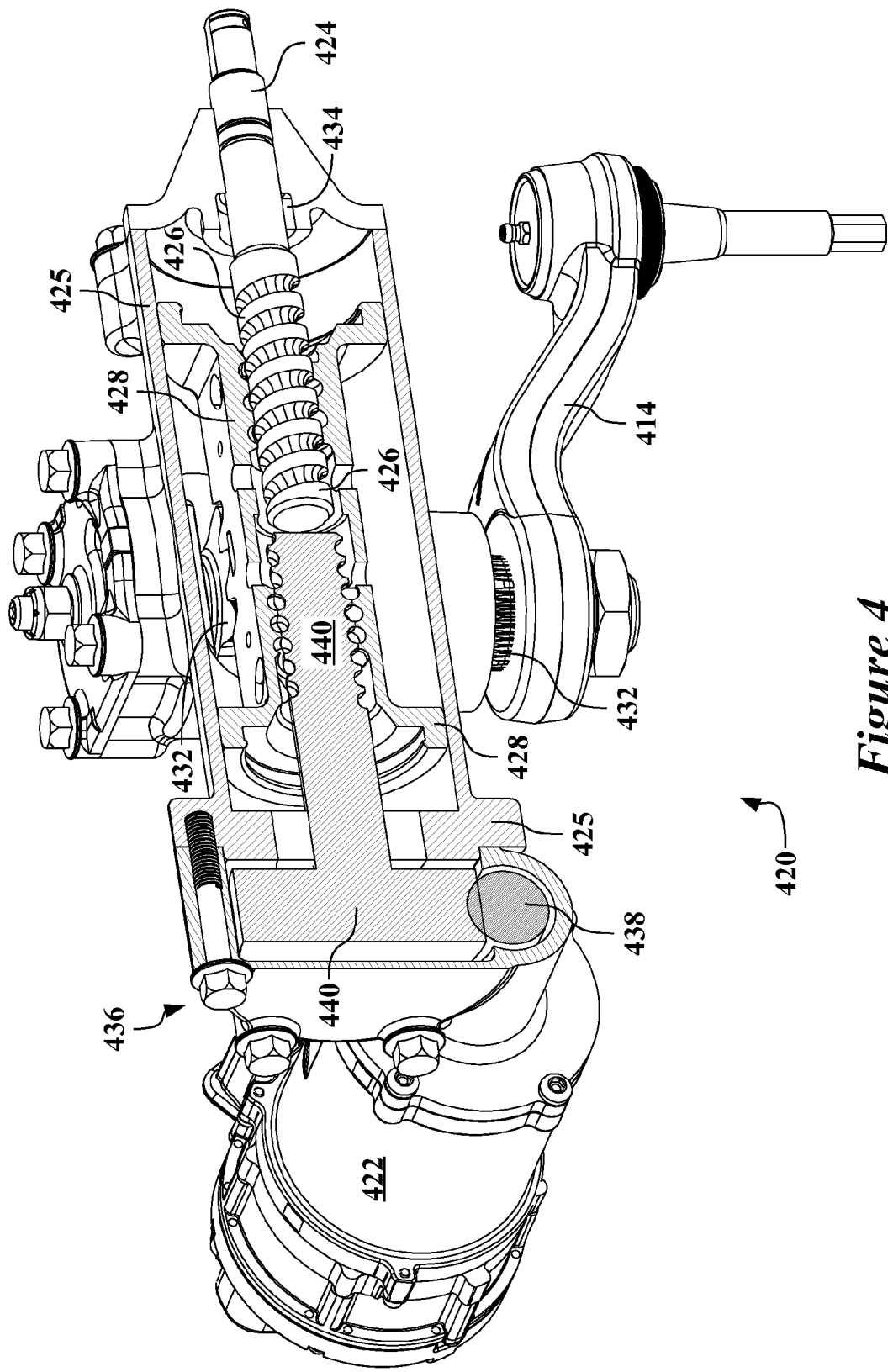
FIG. 4 is a schematic, isometric, partial cross-sectional view of an electric recirculating ball mechanism usable with power steering systems similar to that shown in FIG. 1, showing power transfer to the recirculating ball mechanism through a second ball screw.

Referring now to FIG. 4, and with continued reference to FIGS. 1-3, there is shown a recirculating ball mechanism 420 usable with power steering systems, such as the steering system 10 shown in FIG. 1. FIG. 4 generally shows a side view of the recirculating ball mechanism 420. Features and components shown in other figures may be incorporated and used with those shown in FIG. 4.

The recirculating ball mechanism 420 combines torque from a steering wheel (not shown) or another input member and an electric motor 422 and transfers torque to and from a pitman arm 414. An input shaft 424 is operatively connected to the steering wheel and is carried within a housing 425. A cross-section plane has been taken through the housing 425 to better illustrate the workings of the recirculating ball mechanism 420. The input shaft 424 has a first ball screw 426 formed on one end. The first ball screw 426 shown is formed as an integral, one-piece member with the input shaft 424.

A first ball nut 428 circumscribes the first ball screw 426 and is in torque-transfer communication with the first ball screw 426 through a plurality of ball bearings (not shown), which circulate between the first ball screw 426 and the first ball nut 428. The housing 425 surrounds the first ball nut 428 and guides movement thereof. Rotation of the steering wheel causes the input shaft 424 and the first ball screw 426 to rotate. As the first ball screw 426 rotates, the rotation is transferred to the first ball nut 428 and causes linear movement (generally left and right, as viewed in FIG. 4) of the first ball nut 428.

The first ball nut 428 is meshed with a sector gear 432 (largely hidden from view) for torque transfer therewith. The sector gear 432 is rigidly attached, such as through a splined connection, to the pitman arm 414. Therefore, linear movement of the first ball nut 428 causes rotation of the sector gear 432, such that movement of the steering wheel results in movement of the sector gear 432 and the pitman arm 414.

The recirculating ball mechanism 420 includes one or more sensors 434 configured to determine torque at the input shaft 424 or the first ball screw 426. The sensors 434 monitor the torque and displacement of the input shaft 424 communicated from the operator inputs to the steering wheel, and also monitor the reactive torque transferred back to the input shaft 424 by the vehicle wheels. The sensors 434 may include multiple sensors of different types and may be in communication with a control system (not shown) to process signals or commands from the sensors 434.

The electric motor 422 is configured to selectively supply torque to the sector gear 432 through the recirculating ball mechanism 420. The amount of torque delivered by the electric motor 422 may be based, in part, upon the signals from the sensors 434, the control system, or other components and sensors.

A drive unit 436 is disposed between the electric motor 422 and the first ball nut 428, and enables torque transfer between the electric motor 422 and the sector gear 432. Portions of the drive unit 436 have also been cross-sectioned to better illustrate the workings of the drive unit 436.

The recirculating ball mechanism 420 further includes a second ball screw 440, which is substantially coaxial with the first ball screw 426. The second ball screw 440 is also in torque-transfer communication with the first ball nut 428 through the plurality of ball bearings. Therefore, torque may be transferred to the first ball nut 428 from either or both of the first ball screw 426 and the second ball screw 440.

In the configuration shown in FIG. 4, the drive unit 436 is driven by a worm gear 438, and is directly connected to, and acts on, the second ball screw 440 through a gear attached thereto. In the configuration shown in FIG. 4, the drive unit 436 acts on the end of the housing 425 opposite from the input shaft 424. The connections between the drive unit 436 and the second ball screw 440 are shown schematically, and individual gear teeth are not illustrated. The second ball screw 440 and the first ball screw 426 then transfer combined torque to the first ball nut 428. Therefore, the electric motor 422 boosts the torque and power delivered to the sector gear 432 and the vehicle wheels.

Figure 5:
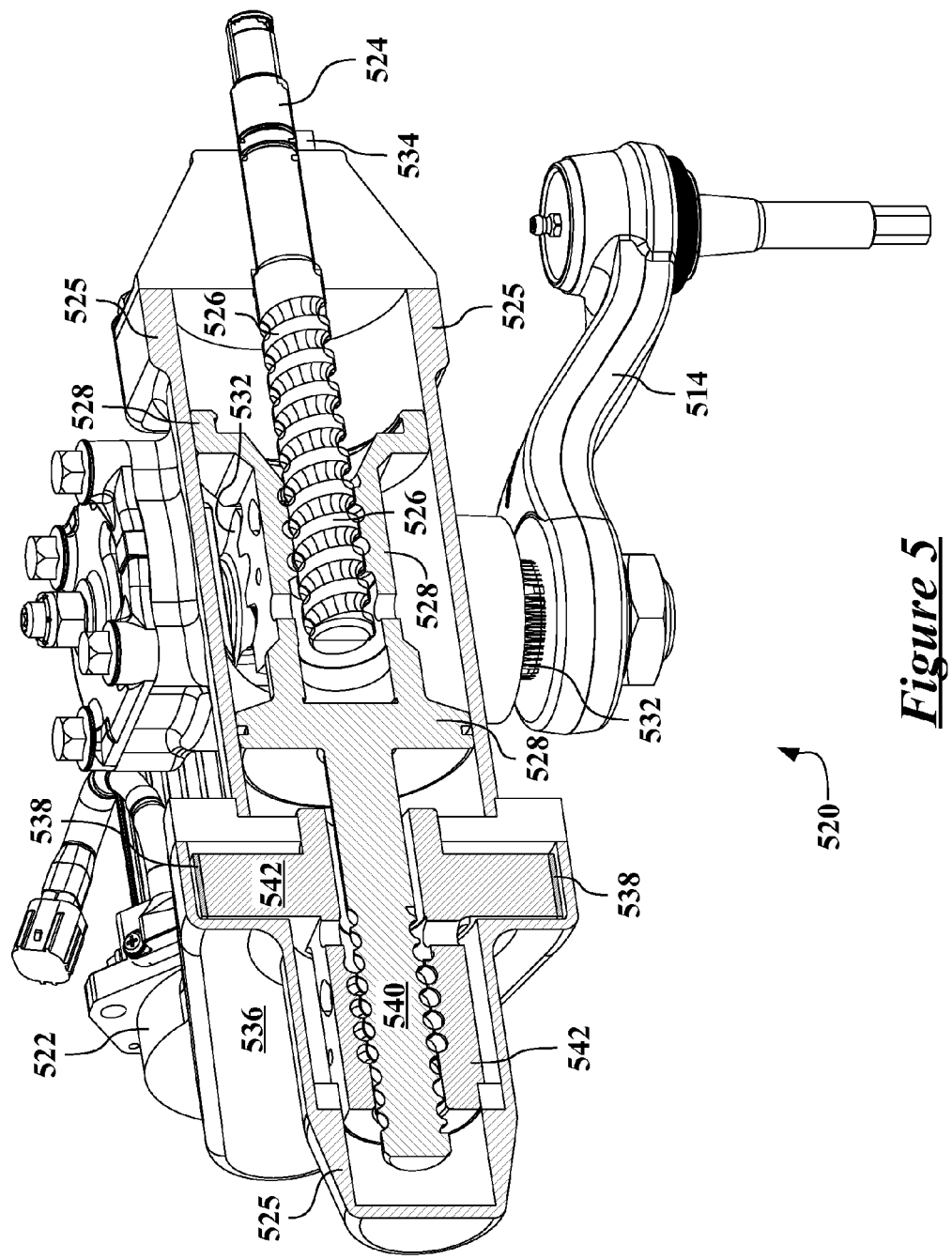
FIG. 5 is a schematic, isometric, partial cross-sectional view of an electric recirculating ball mechanism usable with power steering systems similar to that shown in FIG. 1, showing power transfer to the recirculating ball mechanism through a second ball nut.

Referring now to FIG. 5, and with continued reference to FIGS. 1-4, there is shown a recirculating ball mechanism 520 usable with power steering systems, such as the steering system 10 shown in FIG. 1. FIG. 5 generally shows a side view of the recirculating ball mechanism 520. Features and components shown in other figures may be incorporated and used with those shown in FIG. 5.

The recirculating ball mechanism 520 combines torque from a steering wheel (not shown) or another input member and an electric motor 522 and transfers torque to and from a pitman arm 514. Much of the electric motor 522 is hidden from view in FIG. 5. An input shaft 524 is operatively connected to the steering wheel and is carried within a housing 525. A cross-section plane has been taken through the housing 525 to better illustrate the workings of the recirculating ball mechanism 520.

The input shaft 524 has a first ball screw 526 formed on one end. The first ball screw 526 shown is formed as an integral, one-piece member with the input shaft 524. The housing 525 may be formed in more than one piece and may include various seals and bearings to facilitate movement of the components of the recirculating ball mechanism 520.

A first ball nut 528 circumscribes the first ball screw 526 and is in torque-transfer communication with the first ball screw 526 through a plurality of ball bearings (not shown), which circulate between the first ball screw 526 and the first ball nut 528. The housing 525 surrounds the first ball nut 528 and guides movement thereof.

Rotation of the steering wheel causes the input shaft 524 and the first ball screw 526 to rotate. As the first ball screw 526 rotates, the rotation is transferred to the first ball nut 528 and causes linear movement (generally left and right, as viewed in FIG. 5) of the first ball nut 528.

The first ball nut 528 is meshed with and engages a sector gear 532 (largely hidden from view) for torque transfer therewith. The sector gear 532 is rigidly attached, such as through a splined connection, to the pitman arm 514. Therefore, linear movement of the first ball nut 528 causes rotation of the sector gear 532, such that movement of the steering wheel results in movement of the sector gear 532 and the pitman arm 514. The housing 525 and the sector gear 532 prevent rotation of the first ball nut 526, such that it may translate but may not rotate.

The recirculating ball mechanism 520 includes one or more sensors 534 configured to determine torque at the input shaft 524 or the first ball screw 526. The sensors 534 monitor the torque and displacement of the input shaft 524 communicated from the operator inputs to the steering wheel, and also monitor the reactive torque transferred back to the input shaft 524 by the vehicle wheels. The sensors 534 may include multiple sensors of different types and may be in communication with a control system (not shown) to process signals or commands from the sensors 534.

The electric motor 522 is configured to selectively supply torque to the sector gear 532 through the recirculating ball mechanism 520. The amount of torque delivered by the electric motor 522 may be based, in part, upon the signals from the sensors 534, the control system, or other components and sensors.

A drive unit 536 is disposed between the electric motor 522 and the first ball nut 528, and enables torque transfer between the electric motor 522 and the sector gear 532. Portions of the drive unit 536 have also been cross-sectioned to better illustrate the workings of the drive unit 536.

The recirculating ball mechanism 520 further includes a second ball screw 540, which is substantially coaxial with the first ball screw 526. The second ball screw 540 is formed integrally, as one-piece, with the first ball nut 528. Therefore, the first ball nut 528 and the second ball screw 540 move in conjunction. Unlike the second ball screw 440 shown in FIG. 4, the second ball screw 540 shown in FIG. 5 only slides and does not rotate.

The recirculating ball mechanism 520 also includes a second ball nut 542 that circumscribes the second ball screw 540 and is in torque-transfer communication with the second ball screw 540 through the plurality of ball bearings, which circulate between the second ball screw 540 and the second ball nut 542. The recirculating ball mechanism 520 may include two separate sets of ball bearings within the plurality of ball bearings. The housing 525 also surrounds the second ball nut 540 and guides movement thereof. Unlike the first ball nut 526, the second ball nut 542 rotates, but does not translate within the housing 525.

In the configuration shown in FIG. 5, the drive unit 536 is driven by a chain or a belt 538, and is directly connected to, and acts on, the second ball nut 542 through a gear or flange attached thereto. In the configuration shown in FIG. 5, the drive unit 536 acts on the end of the housing 525 opposite from the input shaft 524. The connections between the drive unit 536 and the second ball nut 542 are shown schematically. The second ball nut 542 transfers torque from the electric motor 522 to the second ball screw 540, which is attached to the first ball nut 528.

The combined torque from the electric motor 522 through the second ball nut 542 and from the steering wheel through the first ball screw 526 is transferred to the first ball nut 528. Therefore, the electric motor 522 boosts the torque and power delivered to the sector gear 532 and the vehicle wheels.

The recirculating ball mechanisms 220, 320, 420, and 520 shown in the figures may also be used with rear-wheel steering systems in drive-by-wire configurations. In such a configuration, the recirculating ball mechanisms 220, 320, 420, and 520 may convert input signals from the steering wheel into torque commands for the electric motors 222, 322, 422, and 522, which will then control movement of the rear wheels.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A power steering system for transferring torque to a sector gear, comprising:
   a first ball screw;
   a first ball nut circumscribing the first ball screw and in torque-transfer communication with the first ball screw through a plurality of ball bearings, wherein the first ball nut is meshed with the sector gear for torque transfer therewith;
   an electric motor configured to supply torque to the sector gear through the first ball nut;
   a drive unit disposed between the electric motor and the first ball nut; and
   a second ball screw substantially coaxial with the first ball screw.

2. The power steering system of claim 1, further comprising:
   a second ball nut circumscribing the second ball screw and in communication with the second ball screw through the plurality of ball bearings.

3. The power steering system of claim 2, wherein the second ball screw and the first ball nut are formed integrally as a one-piece unit.

4. The power steering system of claim 3, wherein the drive unit is directly connected to and acts on the second ball nut.

5. The power steering system of claim 4, further comprising:
   a steering wheel;
   an input shaft; and
   wherein the power steering system is characterized by the lack of a boost mechanism disposed between the steering wheel and first ball screw.

6. The power steering system of claim 5, further comprising:
a sensor configured to determine torque at the input shaft.

7. The power steering system of claim 1, further comprising:
wherein the second ball screw is in torque-transfer communication with the first ball nut through the plurality of ball bearings, such that torque may be transferred to the first ball nut from the first ball screw and from the second ball screw.

8. The power steering system of claim 7, wherein the drive unit is directly connected to and acts on the second ball screw.

9. A power steering system for transferring torque between a steering wheel and a sector gear, comprising:
an input shaft operatively connected to the steering wheel;
a first ball screw, wherein the first ball screw is formed on the input shaft;
a first ball nut circumscribing the first ball screw and in torque-transfer communication with the first ball screw through a plurality of ball bearings, wherein the first ball nut is meshed with the sector gear for torque transfer therewith;
a second ball screw substantially coaxial with the first ball screw;
a sensor configured to determine torque at the input shaft;
an electric motor configured to supply torque to the sector gear through the first ball nut; and
a drive unit disposed between the electric motor and the first ball nut.

10. The power steering system of claim 9, further comprising:
a second ball nut circumscribing the second ball screw and in communication with the second ball screw through the plurality of ball bearings.

11. The power steering system of claim 10, wherein the second ball screw and the first ball nut are integrally formed as a one-piece unit.

12. The power steering system of claim 11, wherein the drive unit is directly connected to and acts on the second ball nut.

13. The power steering system of claim 12, wherein the steering system is characterized by the lack of a boost mechanism on a steering column disposed between the steering wheel and the input shaft.

14. The power steering system of claim 9,
wherein the second ball screw is substantially coaxial with the first ball screw and is in torque-transfer communication with the first ball nut through the plurality of ball bearings, such that torque may be transferred to the first ball nut from the first ball screw and from the second ball screw; and
wherein the drive unit is directly connected to and acts on the second ball screw.

* * * * *